United States Patent [19]
Gebhardt

[11] Patent Number: 5,920,570
[45] Date of Patent: Jul. 6, 1999

[54] RELIABLE MULTI-CAST QUEUE

[75] Inventor: Robert William Gebhardt, Boulder, Colo.

[73] Assignee: Lucent Technologies Inc., Murray Hill, N.J.

[21] Appl. No.: 08/757,063

[22] Filed: Nov. 26, 1996

[51] Int. Cl.[6] .................................................. H04J 3/24
[52] U.S. Cl. .......................................... 370/429; 370/389
[58] Field of Search ...................... 370/429, 389, 370/428, 426, 412, 392, 401; 395/200.61, 671, 800.29, 859, 874, 183.21, 183.22; 380/25, 49

[56] References Cited

U.S. PATENT DOCUMENTS

| | | | |
|---|---|---|---|
| 4,615,001 | 9/1986 | Hudgins, Jr. ............................ | 364/200 |
| 4,984,272 | 1/1991 | McIlroy et al. ............................ | 380/25 |
| 5,473,608 | 12/1995 | Gagne et al. ............................ | 370/401 |
| 5,692,156 | 11/1997 | Bahls et al. ............................ | 395/492 |

*Primary Examiner*—Dang Ton
*Attorney, Agent, or Firm*—Werner Ulrich

[57] ABSTRACT

An arrangement for transmitting data messages from a source to a plurality of destinations. A single file set stores messages from the source, but a plurality of processes transmits the messages to the destinations. A particular destination can receive the messages by having a process for such transmission. Advantageously, the source need not have a record of the identity or number of the destinations.

16 Claims, 3 Drawing Sheets

5,920,570

RELIABLE MULTI-CAST QUEUE

TECHNICAL FIELD

This invention relates to the queuing and transmission of data messages.

PROBLEM

In data processing control and telecommunication systems, a source of messages generates data messages which must be transmitted to a plurality of destinations. It is desirable that the source should not have to be kept up to date as to which destinations should receive messages, but that decision should be made in an intermediate unit which acts effectively as a data switch. A problem of the prior art is that there has been no satisfactory economic and reliable solution to the problem of transmitting messages from a source to selective ones of a plurality of destinations, wherein the selection is not made at the source.

SOLUTION

The above problem is solved and an advance is made over the prior art in accordance with this invention, wherein the source of messages transmits its messages to a single queue in a data switching arrangement and wherein the various messages in the queue are each transmitted under the control of a plurality of program processes to a plurality of destinations; each of the processes for controlling transmission to a destination transmits the messages to each appropriate destination; a message is cleared only after all destinations have received the message. Advantageously, the source of the messages need not know the identity or number of the destinations.

In accordance with one specific implementation, the examining process increments a counter associated with a file containing a message. When the message is transmitted this counter is decremented. The message is cleared from the system only after the counter has been decremented to zero.

In a preferred implementation of applicants' invention each of the destinations has an associated read indicator indicating how far in the queue messages have been transmitted to that destination. Further associated with each destination is an examination indicator indicating how far in the queue messages have been examined to determine whether there are messages to be transmitted to that destination. When a message is examined, the counter for that message is incremented; after the message has been transmitted to any destination that counter is decremented.

In accordance with one feature of applicant's invention, the counter starts with a value of one. A special process which is called less frequently than the slowest examining process of the destinations does not increment the counter but decrements the counter without sending a message. Advantageously, this guarantees that the counter will go to zero at a time when a message can be properly cleared from its file, even if one or more of the examining processes are slow.

DETAILED DESCRIPTION

Figure 1:
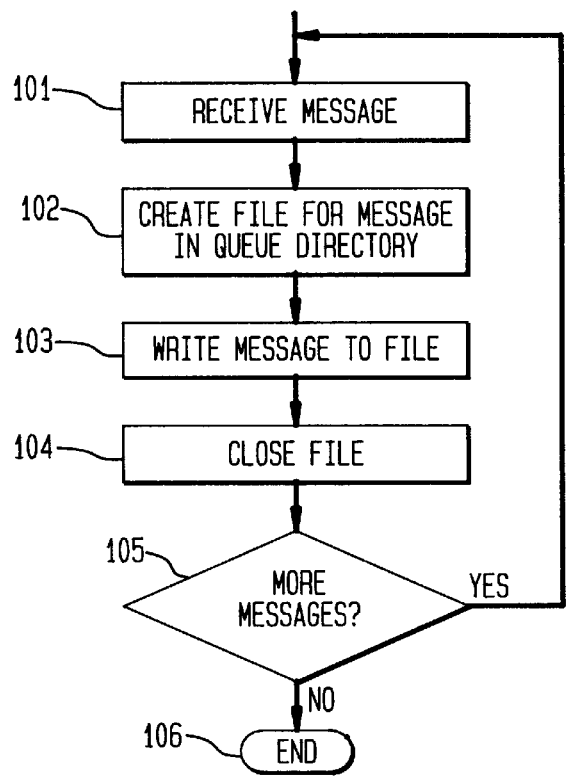
FIG. 1 is a flow diagram of a write process for receiving messages.

FIG. 1 illustrates the process by which messages are received. In block 101 a data entity, typically a message, is received. A queue arrangement for storing and controlling messages comprises a control queue and a set of files. A file for the message is created in the queue directory (action block 102) and the message is written into that file (action block 103). For reasons to be explained below, the reference counter for that file is initially set to 1. The file is then closed (action block 104) and a write indicator, in this embodiment, a write pointer, is updated so that a subsequent message is written into a next file selected by the queue directory. Test 105 determines whether there are more messages. If so, action block 101 is re-entered; if not, this is the end of the receive message process until the next time that a message is received (action block 105).

Figure 2:
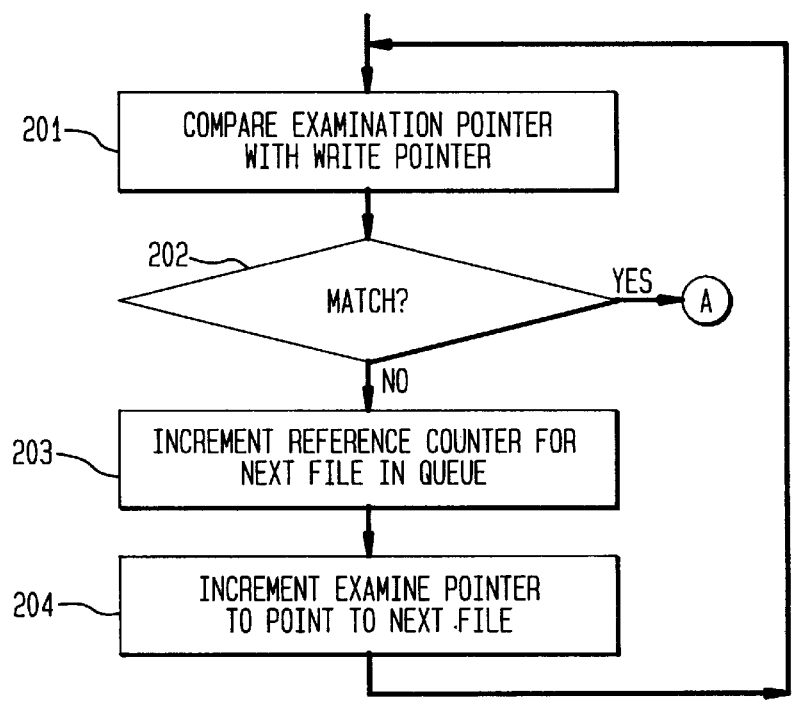
FIGS. 2 and 3 are flow charts of a read process for transmitting received messages to one destination.
Figure 3:
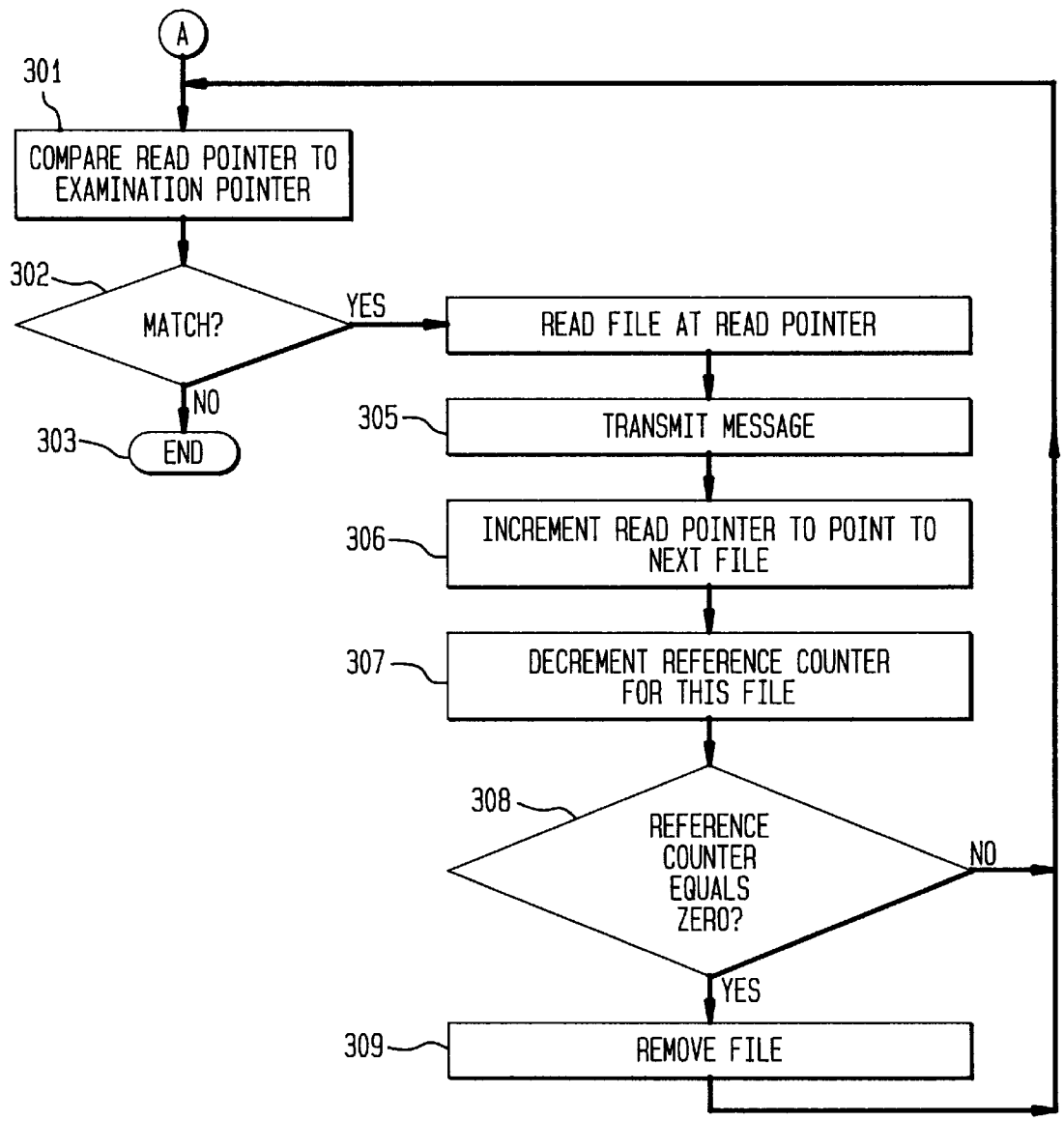

FIG. 2 illustrates the examination process used to make messages available to a destination. There is an examination process for each destination and each examination process has its own examination and read indicators, in this embodiment, pointers. Corresponding to each examination process there is a read process illustrated in FIG. 3. The examination process starts in action block 201 when the examination pointer of the examination process is compared with the write pointer previously described with respect to action block 104 (FIG. 1). Test 202 is used to determine whether the two match. If so, then action block 301 of FIG. 3 is entered. (Action block 301 is the beginning of the read process associated with this examination process.) If there is no match then the reference counter for the next file in the queue is incremented (action block 203). The examination pointer is incremented to point to the next file (action block 204) and action block 201 is re-entered.

FIG. 3 illustrates the process of transmitting messages received in FIG. 1, to a specific one of the destinations. As stated above, each transmitting (read) process corresponds to an examination process and has its own read pointer. This read pointer is compared to the examination pointer (action block 301). Test 302 is used to determine whether the two match. If so, this is the end of the process for transmitting messages to the specific destination for the time being (end block 303). If there is no match, then the file pointed to by the read pointer is read (action block 304). The message from that file is transmitted to the specific destination of this read process (action block 305). This transmission may include such well-known features as acknowledgement and retransmission in case of failure and other transmission features designed to improve reliability. The read pointer is then incremented to point to the next file (action block 306). The reference counter for the file which was transmitted in action block 305 is decremented (action block 307). Test 308 is used to determine whether the decremented reference counter is now at zero. If not, then action block 201 is reentered. If so, then the file is removed and the message is effectively cleared from the system (action block 309) and action block 201 is re-entered.

In order to ensure that messages are not removed prematurely, the reference counter is initially set to one. A special examination process, which does not transmit messages to any destination, is called at a frequency which ensures that the slowest examination process is carried out more frequently. This special examination process does not increment the reference counter in action block 203, (the "incrementing" for this special process is effectively accomplished by initially setting the counter to 1), but does decrement the reference counter in action block 307 in spite of the fact that it does not transmit a message to any destination. This arrangement ensures that the message is not cleared before all the destinations have received the message.

The basic description of the figures implies that all messages are sent to all destinations of the group that transmits messages from the queue that is loaded in FIG. 1. If an application exists wherein only certain types of messages are to be transmitted to some of the destinations, then the basic arrangement described in FIGS. 1–3 is modified by including in the step of transmitting the message (action block 305, FIG. 3), a determination of whether the destination is to receive this message, and simply not transmitting the message if the determination is negative.

The arrangement described herein satisfies the objective of isolating the write process of FIG. 1 from the examination and transmit (read) processes of FIGS. 2 and 3. If it is necessary for the source to have an acknowledgement that all destinations have received the message, then an acknowledgment is sent to the source when the file is removed in action block 309.

Figure 4:
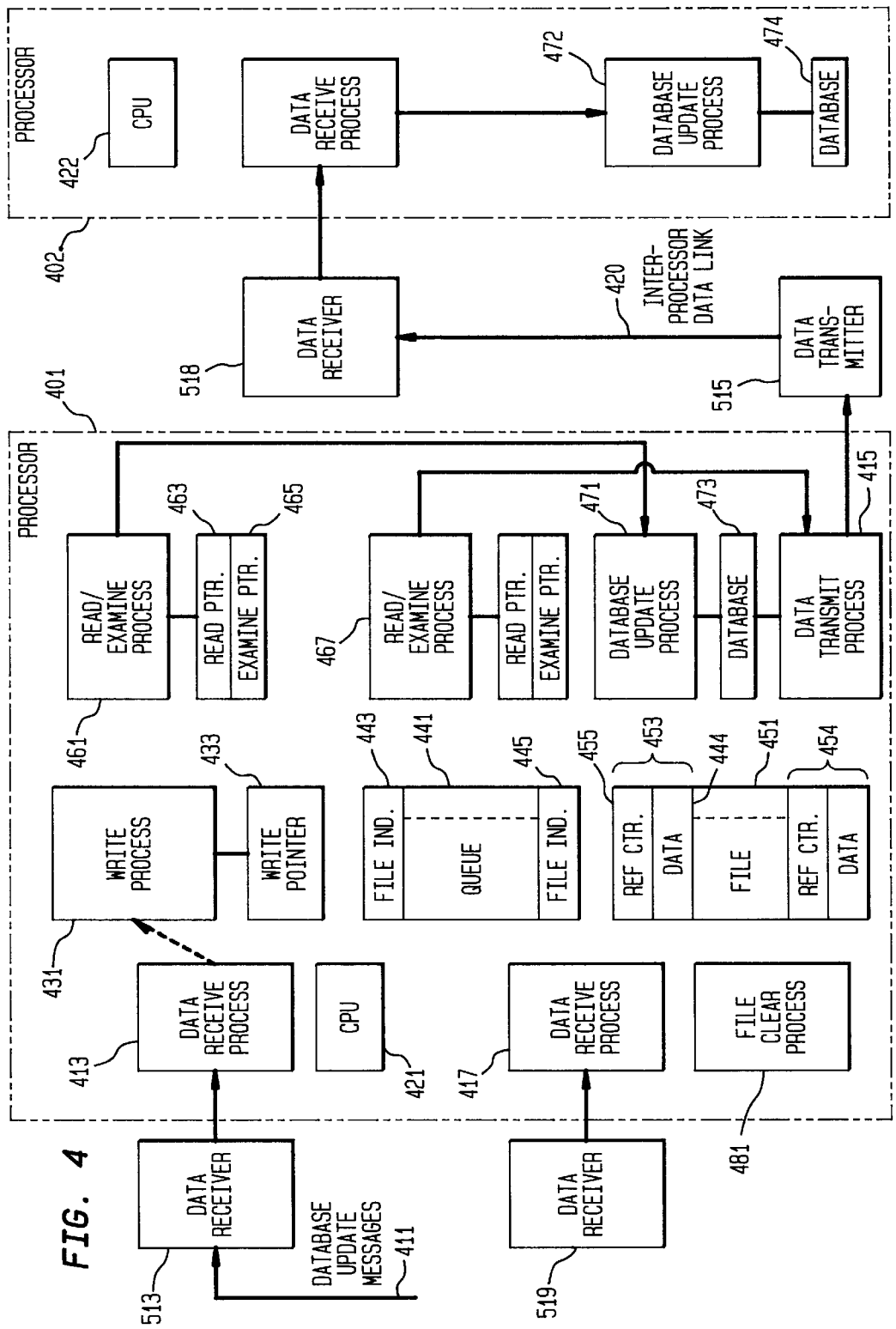
FIG. 4 is a block diagram illustrating applicant's invention.

FIG. 4 is a block diagram illustrating apparatus for a preferred embodiment of applicant's invention. While the preferred embodiment has only two processors and only two destinations it illustrates the basic principles of applicant's invention and can readily be extended for other applications to a larger plurality of destinations. In applicant's preferred embodiment two processors, 401 and 402, act as duplicate processors each for maintaining a database, 473 for processor 401, and 474 for processor 402. (For clarity all numerals referring to processor 402 are even numbers, one higher, than the corresponding element for processor 401.) Each processor includes a central processing unit, 421 and 422 respectively for the two processors, a plurality of program processes, and data such as the queues, the files and the pointers. For simplicity, only the pertinent processes are shown in each processor, even though each processor contains a copy of al processes. For simplicity, the databases 473 and 474 are shown within the processor, but clearly they could be outside the processor.

In the specific example it is assumed that processor 401 is the active processor that receives the database update messages and that processor 401 then transmits update messages to processor 402. The database associated with processor 402 is one of the "destinations" referred to in this description. Processor 401 receives database update messages on input data link 411 connected to a data receiver 513 data connected to a receive process 413. The receive process strips protocol data from the received message, and stores these messages in a queue. Processor 401 transmits update messages, taken from the queue, to a destination, in this case processor 402, and its database 474, over interprocessor data link 420 from data transmitter 515, which receives inputs from data transmit process 415. The interprocessor database update messages are received in processor 402 in a data receiver 518 corresponding to a data receiver 517 in processor 401. (The data receiver 517 in processor 401 is connected to an interprocessor data link (not shown) and receives database update messages from processor 402 whenever processor 402 is the active processor which receives the database update messages from the outside world.)

Processor 401 receives the update messages from the receiver 513 via receive process 413 which sends the messages to write process 431 which uses its associated write pointer 433 to select the next entry in queue 441. Queue 441 has a plurality of file indicators 443, . . . , 445 each for indicating an address of an entry in the file for storing received data. This file 451 is shown for convenience as one long table, but clearly, in normal practice, consists of fragmented blocks of memory. The file contains a plurality of entries 453, . . . , 459 each entry such as entry 453 having a reference counter previously described, and the data of the update messages. While in this particular application this data is not extensively processed prior to entry in the file, in other applications such processing can take place. However, it would be the contents of the file that are transmitted under the control of the read and examination processes to each destination (unless the read/examination process performs its own processing on the data).

Processor 401 also includes a plurality, in this case two, of read/examine processes 461 and 467. Associated with each of the read/examination processes is a read pointer and an examine pointer whose use has been described with respect to FIGS. 2 and 3. Read/examine process 461 takes the contents of a file entry and transmits them to a database update process 471 within processor 401. Database update process 471 then uses the data to update the contents of database 473. Read/examine process 467 and its associated read and examination pointers controls the transmission of data from the file to processor 402 by a data transmitter process 415, thence a data transmitter 515 to interprocessor data link 420 and data receiver 518. When such a message is received in processor 402, the data receive process 418 transmits the data to the database update process 472 for updating the database 474. Finally, after the messages have been transmitted to their destinations, file clear process 481 of processor 401 clears an entry from the file.

The result of these actions is that the database update messages received on input data link 411 are sent to their destinations database update processes 471 and 472 which control the final destination of the data messages, namely, databases 473 and 474.

It can be readily seen that processor 401 could send messages to many other processors and that instead of sending these messages over an interprocessor data link connected to a transmitter, it could send these messages over a data network connected to a transmitter. The example also illustrates that one of the destinations may be internal to the processor containing the write process. There can be several such internal destinations. In the specific embodiment, one of these internal destinations can be a logging process; note that this other process performs a different function than the first internal process. Note further that the source of the database update messages need not have a record of the final destinations of the messages that it transmits. Note further, that should processor 401 recognize a need to transmit the messages to another destination, it can simply create another read/examine process with its associated read and examination pointers in order to control transmission of the messages to this new destination.

If this arrangement were to be used for updating a distributed database having many separate databases like database 473, then this arrangement can be used to transmit the messages to each of the plurality of databases of the distributed database. One of these databases could be, but need not be, in the same processor as the processor that receives the messages to be transmitted and that contains the write process. If the databases of the distributed database do not all require all of the update messages, then the messages which need not be transmitted to a particular database can be filtered out within action block 305 of the examine/read process for transmitting messages to that database;

alternatively, the message could be sent to the database and simply ignored there.

I claim:

1. A method of distributing data entities, each to ones of a plurality of data destinations comprising the steps of:

receiving the data entities from a source;

entering said data entities into a queue as a plurality of data entities;

for each of said ones of said plurality of destinations, transmitting each of said data entities to said each destination; and after a data entity has been transmitted to all of the destinations to which said data entity is to be transmitted, clearing said data entity from said queue;

whereby said source does not need a record of identities or a number of said ones of said plurality of destinations for each of said data entities.

2. The method of claim 1 further comprising the step of updating administration parameters of said queue to avoid repeated transmission of a data entity to any destination.

3. The method of claim 2 wherein the updating step comprises the step of updating pointers for determining a next data entity to be transmitted to said any destination.

4. The method of claim 1 further comprising the step of determining whether all destinations have received said data entity;

wherein said determining comprises the step of incrementing a counter for said data entity prior to transmitting said data entity to a particular data destination; and decrementing said counter when said data entity has been transmitted to said particular destination.

5. A method of distributing data entities, each to ones of a plurality of data destinations comprising the steps of:

receiving the data entities from a source;

entering said data entities into a queue as a plurality of data entities;

for each of said ones of said plurality of destinations, transmitting each of said data entities to said each destination; and after a data entity has been transmitted to all of the destinations to which said data entity is to be transmitted, clearing said data entity from said queue;

whereby said source does not need a record of identities or a number of said ones of said plurality of destinations for each of said data entities;

wherein said determining comprises the step of incrementing a counter for said data entity prior to transmitting said data entity to a particular data destination; and decrementing said counter when said data entity has been transmitted to said particular destination;

wherein said counter is initially set to one; and wherein a special examination process that does not transmit messages to one of said plurality of destination, and does not increment said counter, but decrements said counter when said special examination process executes a program corresponding to a program for transmitting.

6. The method of claim 4 wherein the step of clearing said data entity from said queue comprises the steps of:

following said decrementing, testing whether said counter has reached a predetermined lower bound; and if said predetermined lower bound has been reached, clearing said data entity of said queue.

7. The method of claim 1 further comprising the step of determining whether a particular destination is to receive a particular data entity prior to transmitting said particular data entity to said particular destination.

8. The method of claim 1 further comprising the step of transmitting an acknowledgment to said source after said data entity has been transmitted to all of the destinations to which said data entity is to be transmitted.

9. A system for receiving data messages and transmitting said data messages to a plurality of destinations comprising:

means for receiving said data messages;

means for transmitting said data messages; and processor means, connected to said means for transmitting and said means for receiving, comprising a processing unit and memory;

said memory comprising queue means for storing a series of messages;

said processor means operative under the control of program processes stored in said memory;

said program processes comprising a write process responsive to receipt of said data messages from said means for receiving data messages, for storing said messages in said queue means and for keeping track of where in said queue means said messages are stored by a write indicator;

said processes comprising a plurality of read processes, each for controlling the transmission of said messages to one of said destinations and each having a read indicator for keeping track of how far in the queue means messages have been transmitted.

10. The system of claim 9 wherein said processor means further comprises a clearance process for clearing a queued message after said queued message has been transmitted to all of said plurality of destinations.

11. The system of claim 10 wherein said clearance process clears a message after all destinations to which said message is to be transmitted have received said message.

12. The system of claim 9 wherein each of said read processes comprises a read/examine process for determining how far in the queue means messages have been received by the write process and wherein each read/examine process further comprises an examination indicator to keep track of how far in the queue means the read/examination process has checked for new messages.

13. The system of claim 9 wherein said means for transmitting data is connected to a data link.

14. The system of claim 9 wherein said means for transmitting data is connected to a data network.

15. The system of claim 9, wherein one of said read processes transmits one of said data messages to another process of said processor means, said another process being a destination of said one of said data messages.

16. The system of claim 9 wherein said queue means comprises file means for storing messages and a queue for keeping track of messages in the order received and stored in said file means.

* * * * *